(12) United States Patent
Huang et al.

(10) Patent No.: US 10,656,841 B1
(45) Date of Patent: May 19, 2020

(54) REDUCING PER-I/O CPU OVERHEAD BY QUEUEING AND BATCHING READ REQUESTS AND READ COMPLETION NOTIFICATIONS

(71) Applicant: MICROSOFT TECHNOLOGY LICENSING, LLC, Redmond, WA (US)

(72) Inventors: Xin Huang, Bothell, WA (US); Bartosz Tomasz Nyczkowski, Redmond, WA (US); Michael Stephen Sterling, Redmond, WA (US); Mark James McNulty, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/251,024

(22) Filed: Jan. 17, 2019

(51) Int. Cl.
*G06F 3/06* (2006.01)
*G06F 13/16* (2006.01)

(52) U.S. Cl.
CPC ............ *G06F 3/0611* (2013.01); *G06F 3/067* (2013.01); *G06F 3/0659* (2013.01); *G06F 3/0661* (2013.01); *G06F 3/0662* (2013.01); *G06F 13/1642* (2013.01)

(58) Field of Classification Search
CPC .................................................. G06F 3/0611
See application file for complete search history.

(56) References Cited

U.S. PATENT DOCUMENTS

| | | | | |
|---|---|---|---|---|
| 8,370,520 B2* | 2/2013 | Kohli | ...................... | H04L 65/60 709/233 |
| 2007/0162611 A1* | 7/2007 | Yu | ...................... | G06Q 30/0242 709/232 |
| 2010/0131671 A1* | 5/2010 | Kohli | ...................... | H04L 65/60 709/233 |
| 2019/0227838 A1* | 7/2019 | Zhou | ...................... | G06F 9/467 |

\* cited by examiner

*Primary Examiner* — Tammara R Peyton
(74) *Attorney, Agent, or Firm* — Newport IP, LLC; Jacob P. Rohwer

(57) ABSTRACT

A storage stack exposes an API for use by user mode applications. An application calls a function exposed by the API to enqueue requests to read a file on a file submission queue ("FSQ"). Read requests in the FSQ are dequeued in batches, and file offsets in the batches of dequeued read requests are translated to disk offsets. The translated batches of read requests are stored in a storage submission queue ("SSQ"). A storage subsystem retrieves batches of the translated read requests from the SSQ and performs the specified read operations. Completion notifications for the read requests are stored in a storage completion queue ("SCQ"). Batches of completion notifications are dequeued from the SCQ and translated to file completions. Batches of file completions are stored in a file completion queue ("FCQ"). The user mode application that submitted the read requests can dequeue batches of completion notifications from the FCQ.

13 Claims, 8 Drawing Sheets

REDUCING PER-I/O CPU OVERHEAD BY QUEUEING AND BATCHING READ REQUESTS AND READ COMPLETION NOTIFICATIONS

BACKGROUND

Modern storage interfaces and protocols are capable of performing large numbers of input/output ("I/O") operations per second ("TOPS"), particularly when used with non-volatile memory devices such as solid-state drives ("SSDs"). In many implementations, however, these interfaces and protocols are utilized by legacy storage stacks that were originally designed for use with much slower interfaces, protocols, and disk-based mass storage devices.

Although legacy storage stacks can interoperate with more modern storage interfaces and protocols, this combination commonly comes at the cost of central processing unit ("CPU") overhead. In particular, full realization of the capabilities of modern storage interfaces and protocols requires a large number of CPU cycles per I/O operation.

Legacy storage stacks also typically provide programmer-friendly file-based interfaces for accessing underlying storage devices. But, this also comes at the cost of sometimes significant CPU utilization. It is possible for user mode applications to obtain near-raw access to available storage devices for low CPU utilization and high IOPS. This can, however, complicate applications significantly since they no longer have access to a file system and must access storage devices at a block level.

It is with respect to these and other technical challenges that the disclosure made herein is presented.

SUMMARY

Technologies are disclosed herein for reducing per-I/O CPU overhead by queuing and batching read requests and read completion notifications. Through implementations of the disclosed technologies, the potential for high numbers of IOPS offered by modern storage interfaces and protocols can be realized while at the same time reducing CPU utilization, even when user mode applications utilize a file-based interface to access storage. Other technical benefits not specifically mentioned herein can also be realized through implementations of the disclosed subject matter.

In order to realize the technical benefits mentioned briefly above, and potentially others, a storage stack exposes an application programming interface ("API") for use by user mode applications. Through the use of functions exposed by the API, user mode applications can submit read requests to a storage stack using a file-based interface. The storage stack, in turn, can perform the read requests using a modern storage interface and protocol, thereby reducing the number of CPU cycles utilized per I/O operation.

In one embodiment, the API disclosed herein exposes a function for creating a queue, referred to herein as the file submission queue ("FSQ"), for storing read requests generated by a user mode application. The API can also expose a function which, when called, will open a specified file for reading.

Once a user mode application has utilized the API to create a FSQ and open a file, the user mode application can call another function exposed by the API for enqueueing requests to read from the file ("read requests") on the FSQ. The read requests identify the file, the offset within the file at which the read is to take place, and the amount of data to read. The read requests can include other information such as, but not limited to, data specifying a priority for the read requests or tags that can be utilized to cancel groups of requests.

In some embodiments, the application submitting the read requests can specify a condition, or conditions, that when satisfied will cause batches of read requests in the FSQ to be dequeued and processed in the manner described below. For example, and without limitation, the application might specify that the read requests in the FSQ are to be dequeued and processed in response to the expiration of a timer, when the FSQ contains a specified number of read requests, or when the FSQ contains requests to read a specified amount of data. The API can also expose a function which, when called by the application, will cause the read requests in the FSQ to be immediately dequeued and processed in the manner described below.

As mentioned briefly above, read requests stored in the FSQ are dequeued in batches. The file offsets in the batches of read requests dequeued from the FSQ are then translated to disk offsets. The translated batches of read requests are then stored in another queue, referred to herein as the storage submission queue ("SSQ"). A storage subsystem can retrieve batches of the translated read requests from the SSQ and perform the read requests on the file using the specified disk offsets.

The storage subsystem can also store completion notifications (which might also be referred to herein as "completions") for the read requests in a queue, referred to herein as the storage completion queue ("SCQ"). Batches of completion notifications are dequeued from the SCQ and translated to file completions corresponding to the file offsets specified in the read requests. Batches of translated file completions are stored in another queue, referred to herein as the file completion queue ("FCQ").

The disclosed API also exposes a function through which the user mode application that submitted the read requests can dequeue completion notifications from the FCQ. Once the user mode application has completed reading from the file, the application can call functions exposed by the API to close the file and close the FSQ.

The technologies disclosed herein can also be utilized in environments where a user mode application is virtualized. In these embodiments, batches of read requests are translated from file offsets to virtual disk offsets, which are stored in a queue referred to herein as the disk submission queue ("DSQ"). Batches of read requests stored in the DSQ are then translated to physical disk offsets, and the translated requests are stored in the SSQ and processed by the storage subsystem. A similar but reverse translation can be performed for completion notifications.

As discussed briefly above, implementations of the technologies disclosed herein can reduce per-I/O CPU utilization for read requests made by user mode applications to a file-based interface to a storage subsystem. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
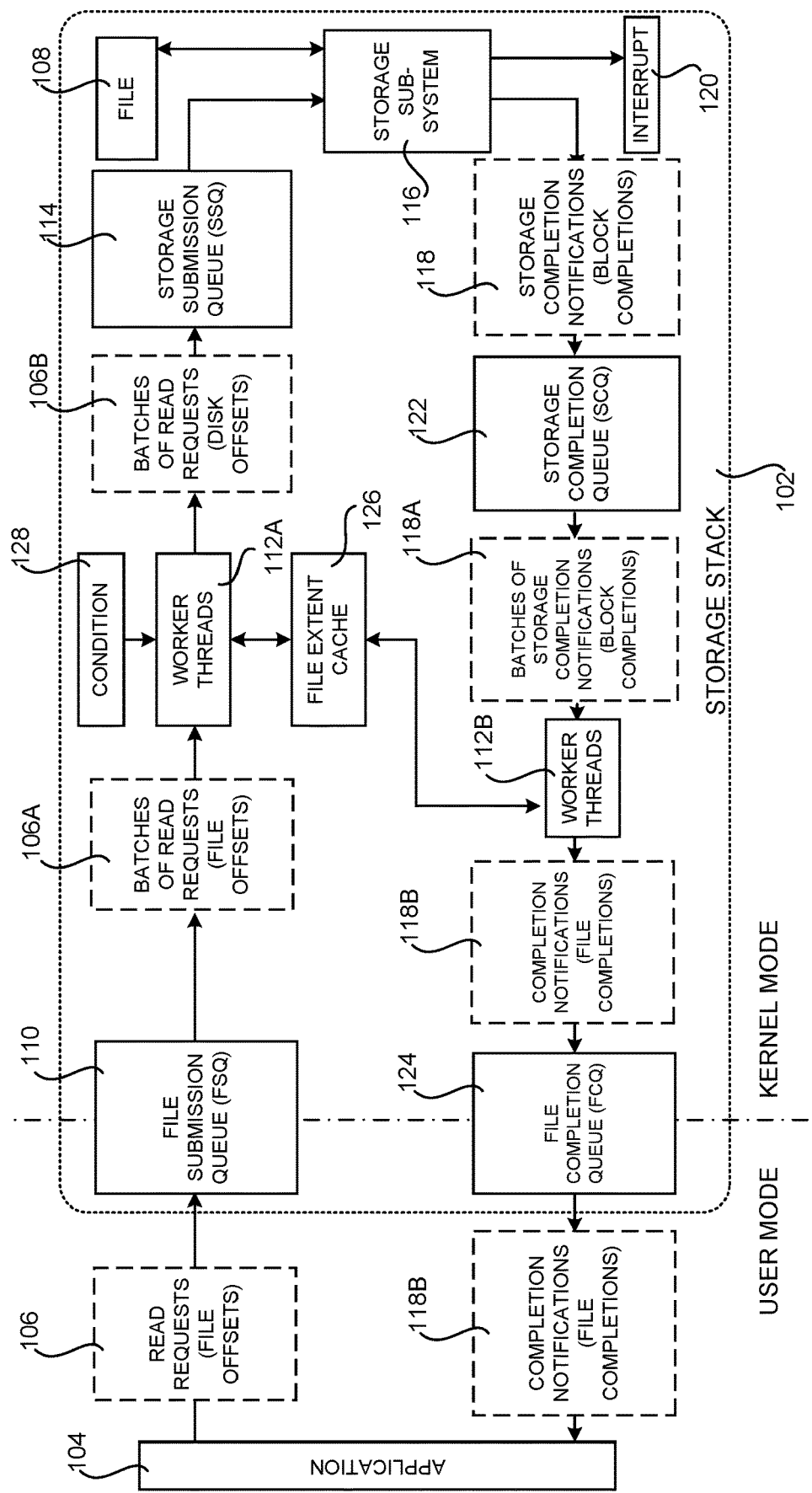
FIG. 1 is a computing architecture diagram that shows aspects of an illustrative storage stack configured for reducing per-I/O CPU overhead by queuing and batching read requests and read completion notifications.

The following detailed description is directed to technologies for reducing per-I/O operation CPU overhead by queuing and batching read requests and read completion notifications. As discussed briefly above, implementations of the disclosed technologies can reduce per I/O operation CPU utilization, even when user mode applications utilize a file-based interface to access storage. Other technical benefits not specifically mentioned herein can also be realized through implementations of the disclosed subject matter.

In the following detailed description, references are made to the accompanying drawings that form a part hereof, and which are shown by way of illustration specific configurations or examples. Referring now to the drawings, in which like numerals represent like elements throughout the several FIGS., aspects of technologies for reducing per-I/O operation CPU overhead by queuing and batching read requests and read completion notifications will be described.

FIG. 1 is a computing architecture diagram that shows aspects of an illustrative storage stack 102 configured for reducing per-I/O CPU overhead by queuing and batching read requests and read completion notifications. As described briefly above, the storage stack 102 exposes an API 200 (shown in FIG. 2) for use by user mode applications, such as the application 104. Through the use of functions 202 (also shown in FIG. 2) exposed by the API 200, a user mode application 104 can submit read requests 106 to the storage stack 102 using a file-based interface. The storage stack 102 can, in turn, perform the read requests using a modern storage interface and protocol, such as a Non-Volatile Memory Express ("NVMe")-compatible storage subsystem 116, thereby reducing the number of CPU cycles utilized per I/O operation.

In one embodiment, the API 200 exposes a function 202A for creating a queue, referred to herein as the file submission queue ("FSQ") 110, for storing requests 106 to read a file 108 generated by a user mode application 104. The API 200 can also expose a function 202B which, when called, will open a specified file 108 for reading.

In some embodiments, file extents are obtained from the storage subsystem 116 storing the file 108 and stored in a cache 126 at the time the file 108 is loaded. File extents map a range of block numbers representing physical locations on a storage device to a particular file 108. As will be described in greater detail below, the file extents stored in the file extent cache 126 can be utilized to convert file offsets in the read requests 106 stored in the FSQ 110 to disk offsets.

Once a user mode application 104 has utilized the API 200 to create a FSQ 110 and open a file 108, the user mode application 104 can call another function 202C exposed by the API 200 for enqueueing requests 106 to read from the file 108 (which might be referred to herein as "read requests") on the FSQ 110. The read requests 106 identify the file 108, the file offset within the file 108 at which the specified read operation is to take place, and the amount of data to read. The read requests 106 can include other information such as, but not limited to, data specifying a priority for the read requests 106 or tags that can be utilized to cancel groups of read requests 106.

In some embodiments, the application 104 submitting the read requests 106 to the FSQ 110 can specify a condition 128, or conditions 128, that when satisfied will cause batches of read requests in the FSQ 110 to be dequeued and processed in the manner described below. For example, and without limitation, the application 104 might specify that the read requests 106 in the FSQ 110 are to be dequeued and processed in response to the expiration of a timer, when the FSQ 110 contains a specified number of read requests 106, or when the FSQ 110 contains requests 106 to read a specified amount of data. The API 200 can also expose a function which, when called by the application 104, will cause the read requests 106 in the FSQ 110 to be immediately dequeued and processed in the manner described below.

As mentioned briefly above, worker threads 112A dequeue read requests 106 stored in the FSQ 110 in batches 106A. The worker threads 112A then translate the file offsets in the batches of read requests 106A to disk offsets using the file extents stored in the file extent cache 126. The worker threads 112A then store translated batches of read requests 106B containing the disk offsets in another queue, referred to herein as the storage submission queue ("SSQ") 114. The storage subsystem 116 can retrieve batches of the translated read requests 106B from the SSQ 114 and perform the read requests (i.e. the read requests 106) on the file 108 using the specified disk offsets.

The storage subsystem 116 can also store completion notifications 118 (which might also be referred to herein as "storage completions 118" or "block completions 118") for the processed batches of read requests 106B in a queue 122, referred to herein as the storage completion queue ("SCQ") 122. The storage completions 118 specify the blocks for which corresponding read requests 106 have been completed.

The storage subsystem 116 might generate an interrupt 120 when it completes a read request 106B and stores the corresponding completion notification 118 in the SCQ 122. The completion notifications 118 on the SCQ 122 can be processed in response to an interrupt 120 in the manner described below.

In some embodiments, the completion notifications 118 are processed each time the storage subsystem 116 generates an interrupt 120. In other embodiments, however, the contents of the SCQ 122 are not processed until a timer has elapsed. In this way, completion notifications 118 are batched for processing in the SCQ 122 and processed less frequently than if they were processed on a per-interrupt basis.

The worker threads 112B dequeue batches of completion notifications 118A from the SCQ 122 and translate the block numbers in the completion notifications to file offsets using the contents of the file extent cache 126. Completion notifications 118B containing the file offsets (which might be referred to herein as "file completions 118B") are then stored in another queue, referred to herein as the file completion queue ("FCQ") 124.

The API 200 also exposes a function 202E through which the user mode application 104 that originally submitted the read requests 106 can dequeue batches of file completions 118B from the FCQ 124. Once the user mode application 104 has completed reading from the file 108, the application can call a function 202F exposed by the API 200 to close the file 108 and another function 202G to close the FSQ 110. Additional details regarding the operation of the storage stack 102 described above will be presented below with regard to FIG. 3.

Figure 2:
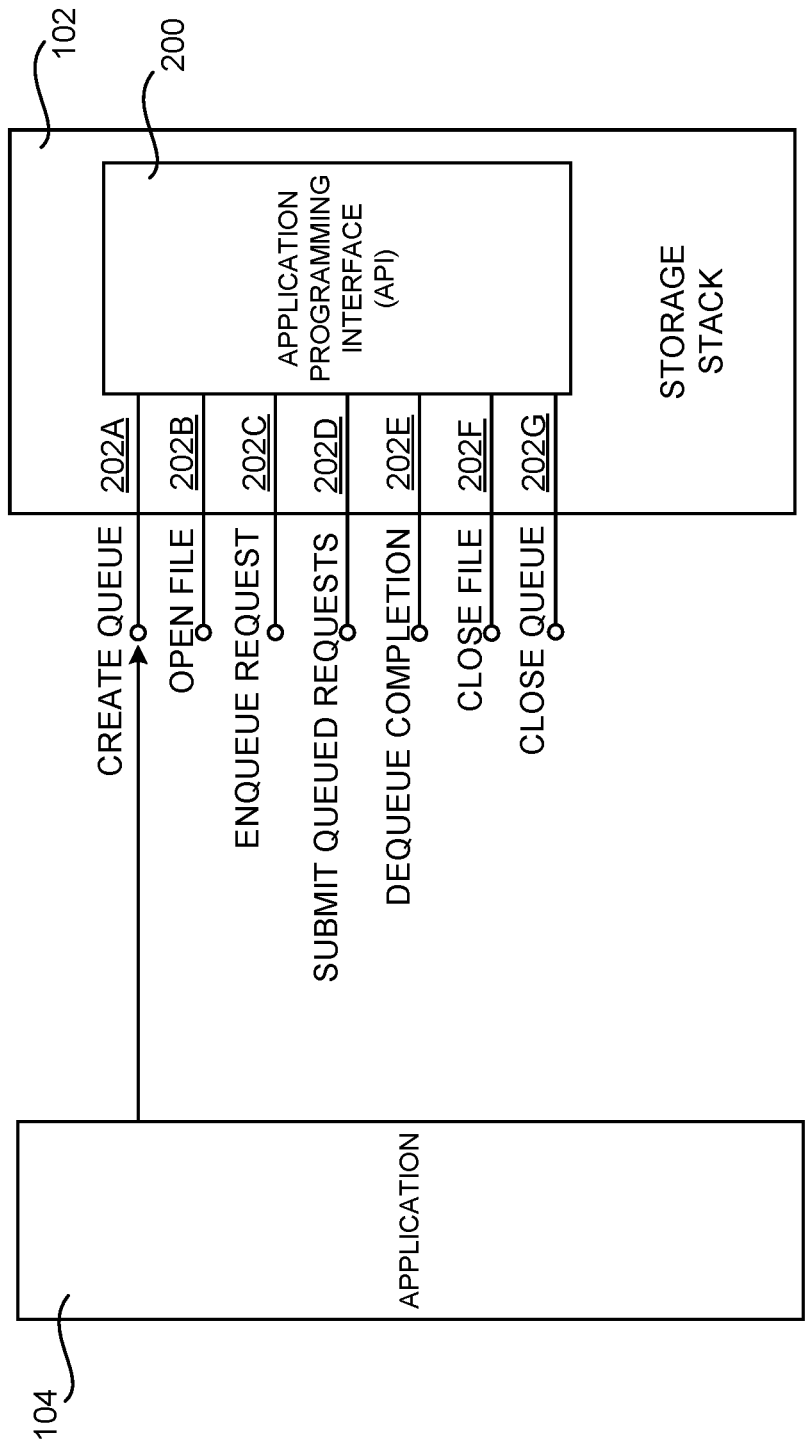
FIG. 2 is a software architecture diagram illustrating aspects of an API disclosed herein for accessing functionality provided by the storage stack shown in FIG. 1.
Figure 3:
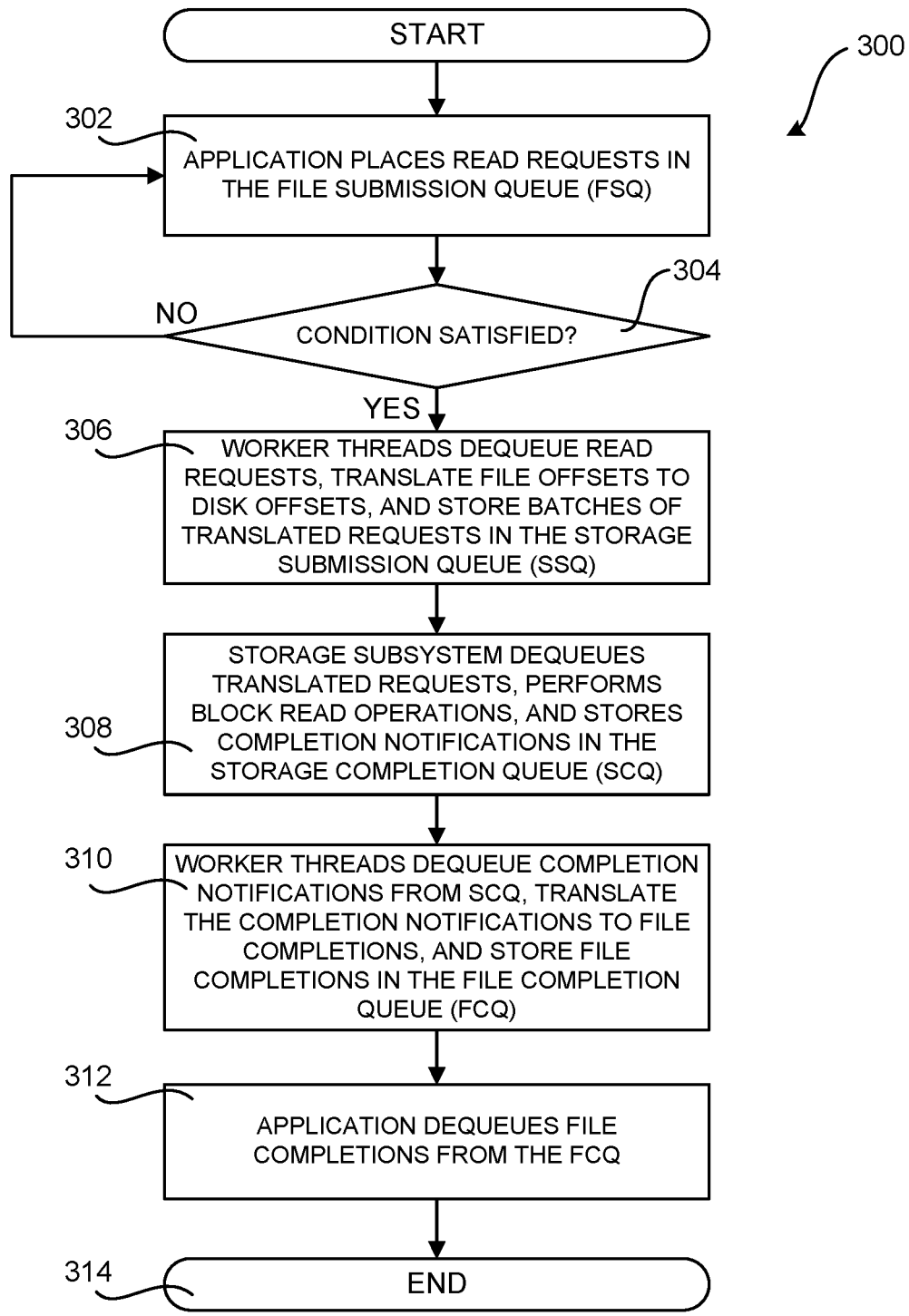
FIG. 3 is a flow diagram showing a routine that illustrates aspects of the operation of the storage stack and API shown in FIGS. 1 and 2, respectively, according to one embodiment disclosed herein.

FIG. 3 is a flow diagram showing a routine 300 that illustrates aspects of the operation of the storage stack 102 and API 200 shown in FIGS. 1 and 2, respectively, according to one embodiment disclosed herein. It should be appreciated that the logical operations described herein with regard to FIG. 3, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 300 begins at operation 302, where the application 104 places read requests 106 in the FSQ 110. The routine 300 then proceeds from operation 300 to operation 304, where a determination is made as to whether a condition 128 specified by the application 104 for processing the FSQ 100 has been satisfied. As discussed above, the application 104 might specify that the read requests 106 in the FSQ 110 are to be dequeued and processed in response to the expiration of a timer, when the FSQ 110 contains a specified number of read requests 106, or when the FSQ 110 contains requests 106 to read a specified amount of data. The application 104 might also call the function 202D to initiate immediate processing of the queued requests 106 by the worker threads 112A.

If the condition 128 specified by the application 104 is satisfied (or if the application calls the function 202D), the routine 300 proceeds from operation 304 to operation 306. At operation 306, the worker threads 112A dequeue batches of read requests 106A, translate the file offsets contained therein to disk offsets, and store batches of translated read requests 106B in the SSQ 114. The routine 300 then proceeds from operation 306 to operation 308.

At operation 308, the storage subsystem 116 dequeues batches of the translated read requests 106A from the SSQ 114, performs the specified block read operations, and stores the corresponding block completions 118 in the SCQ 122. The routine 300 then proceeds to operation 310, where the worker threads 112B dequeue batches of block completions 118 from the SCQ 122, translate the block completions 118 to file completions 118B, and store the file completions 118B in the FCQ 124.

From operation 310, the routine 300 proceeds to operation 312, where the application 104 dequeues batches of file completions from the FCQ 124. The routine 300 then proceeds from operation 312 to operation 314, where it ends.

Figure 4A:
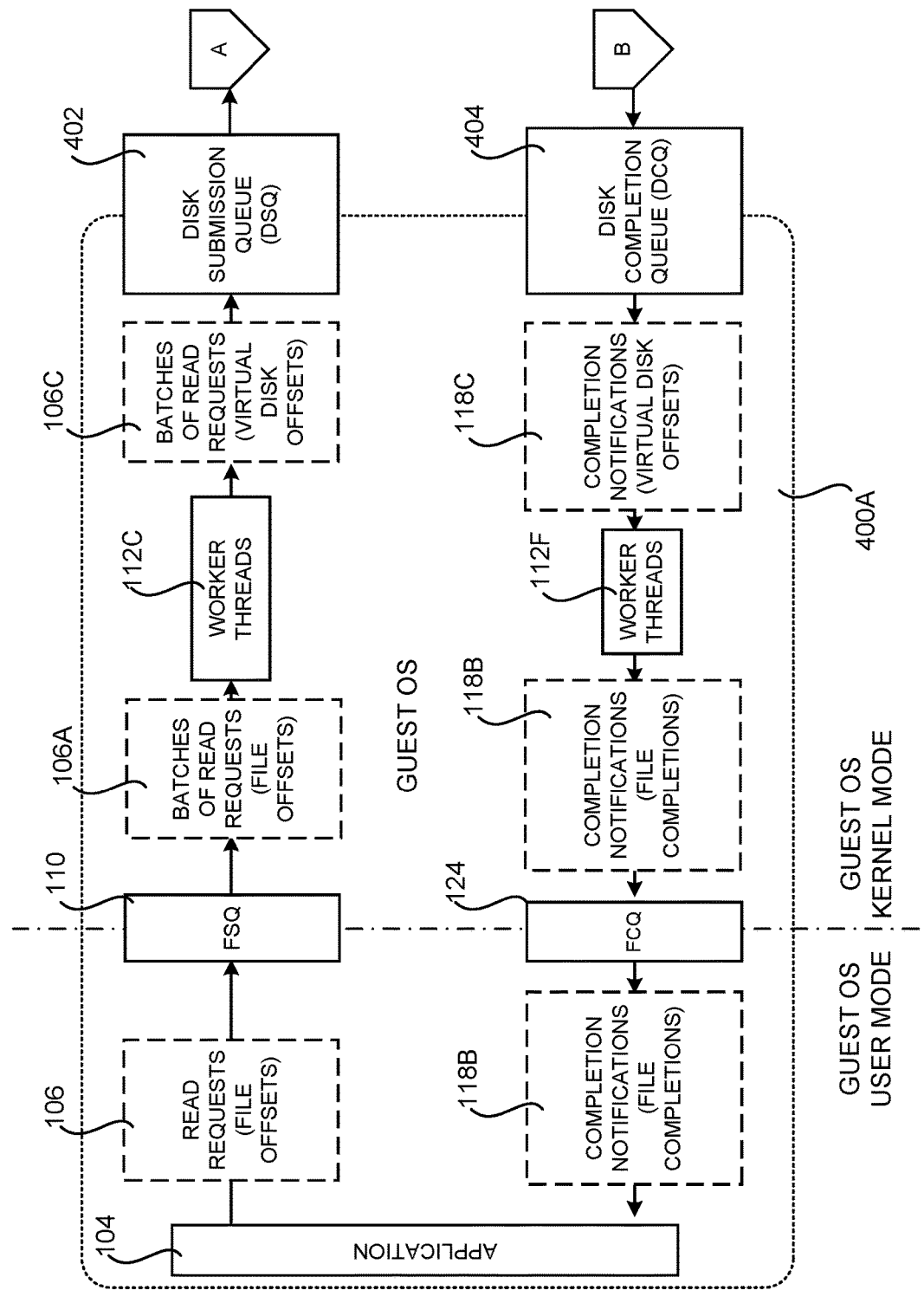
FIGS. 4A and 4B are computing architecture diagrams that show aspects of an illustrative storage stack configured for reducing per-I/O CPU overhead by queuing and batching read requests and read completion notifications in a virtualized computing environment.
Figure 4B:
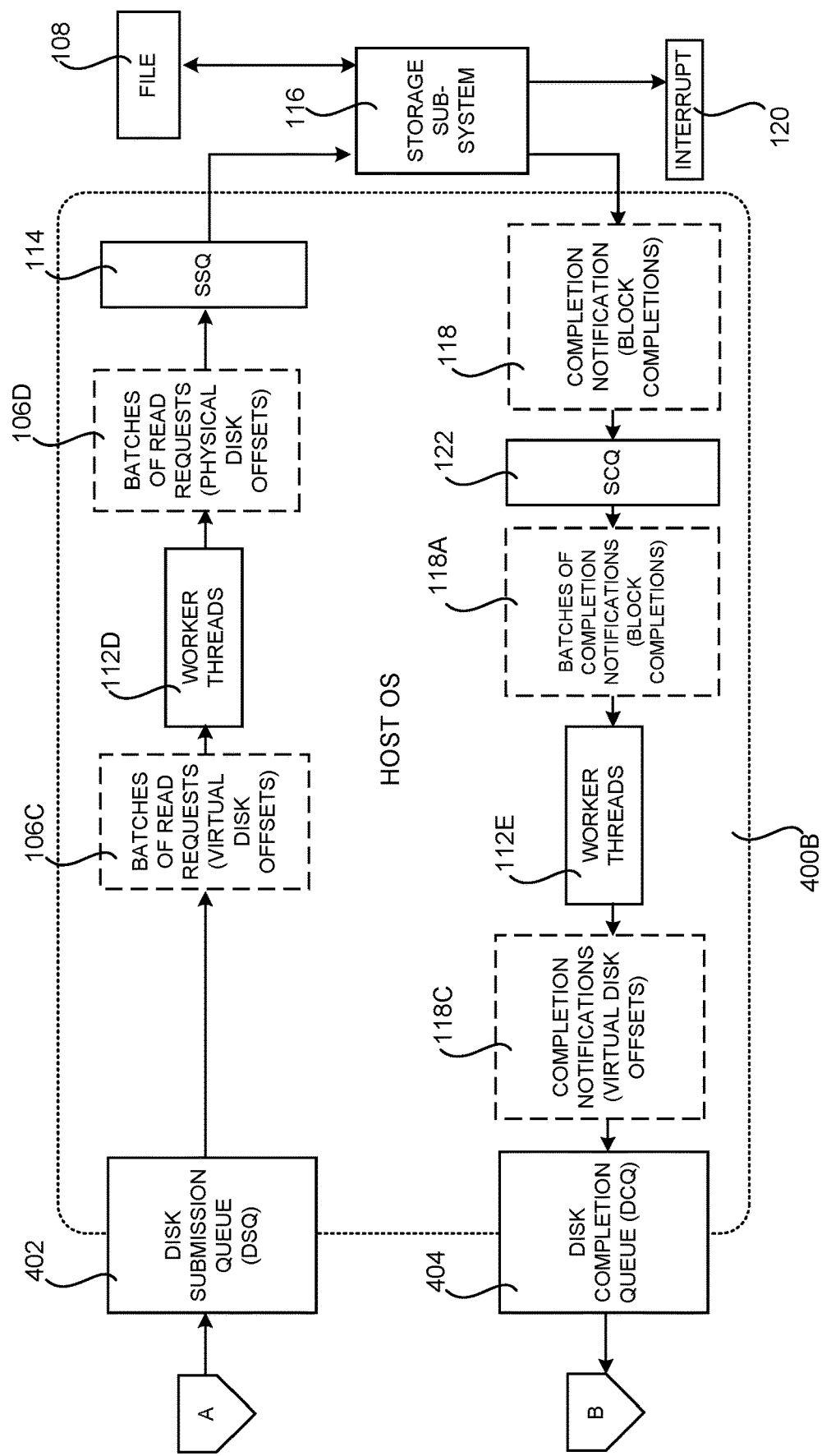

FIGS. 4A and 4B are computing architecture diagrams that show aspects of an illustrative storage stack 200 configured for reducing per-I/O CPU overhead by queuing and batching read requests 106 and read completion notifications 118C in a virtualized computing environment. As discussed briefly above, the technologies disclosed herein can also be utilized in environments where execution of a user mode application 104 is virtualized. In the example configuration shown in FIGS. 4A and 4B, for instance, the application 104 executes in a guest operating system ("OS") 400A, which executes in a virtualized execution environment provided by the host OS 400B (shown in FIG. 4B).

In virtualized environments such as those shown in FIGS. 4A and 4B, a user mode application 104 executing on the guest OS 400A submits read requests 106 to the FSQ 110 in the manner described above. The worker threads 112C dequeue batches of the read requests 106A and translate the file offsets contained therein to virtual disk offsets. The worker threads 112C then store translated batches of the read requests 106C having virtual disk offsets in a queue, referred to herein as the disk submission queue ("DSQ") 402.

Turning momentarily to FIG. 4B, worker threads 112D executing in the host OS 400B dequeue batches of read requests 106C specifying virtual disk offsets from the DSQ 402. The worker threads 112D then convert the virtual disk offsets to physical disk offsets for the file 108 and store batches of translated read requests 106D specifying the physical disk offsets in the SSQ 114. The storage subsystem 116 dequeues the batches of translated read requests 106D from the SSQ 114 and performs the specified read operations.

As discussed above, the storage subsystem 116 stores block completions 118 indicating completion of the read requests 106D on the SCQ 122. The worker threads 112E dequeue batches of block completions 118A from the SCQ 122 (e.g. when a timer expires) and translate the physical disk offsets contained therein to virtual disk offsets. The worker threads 112E then store the completion notifications 118C specifying the virtual disk offsets in a queue, referred to herein as the disk completion queue ("DCQ") 404.

Returning to FIG. 4A, worker threads 112F executing in the guest OS 400A dequeue batches of completions notifications 118C from the DCQ 404. The worker threads 112F then convert the completion notifications 118C that specify virtual disk offsets to file completions 118B. The worker threads 112F also store the file completions 118B on the FCQ 124. The application 104 can then dequeue the file completions 118B from the FCQ 124.

Figure 5:
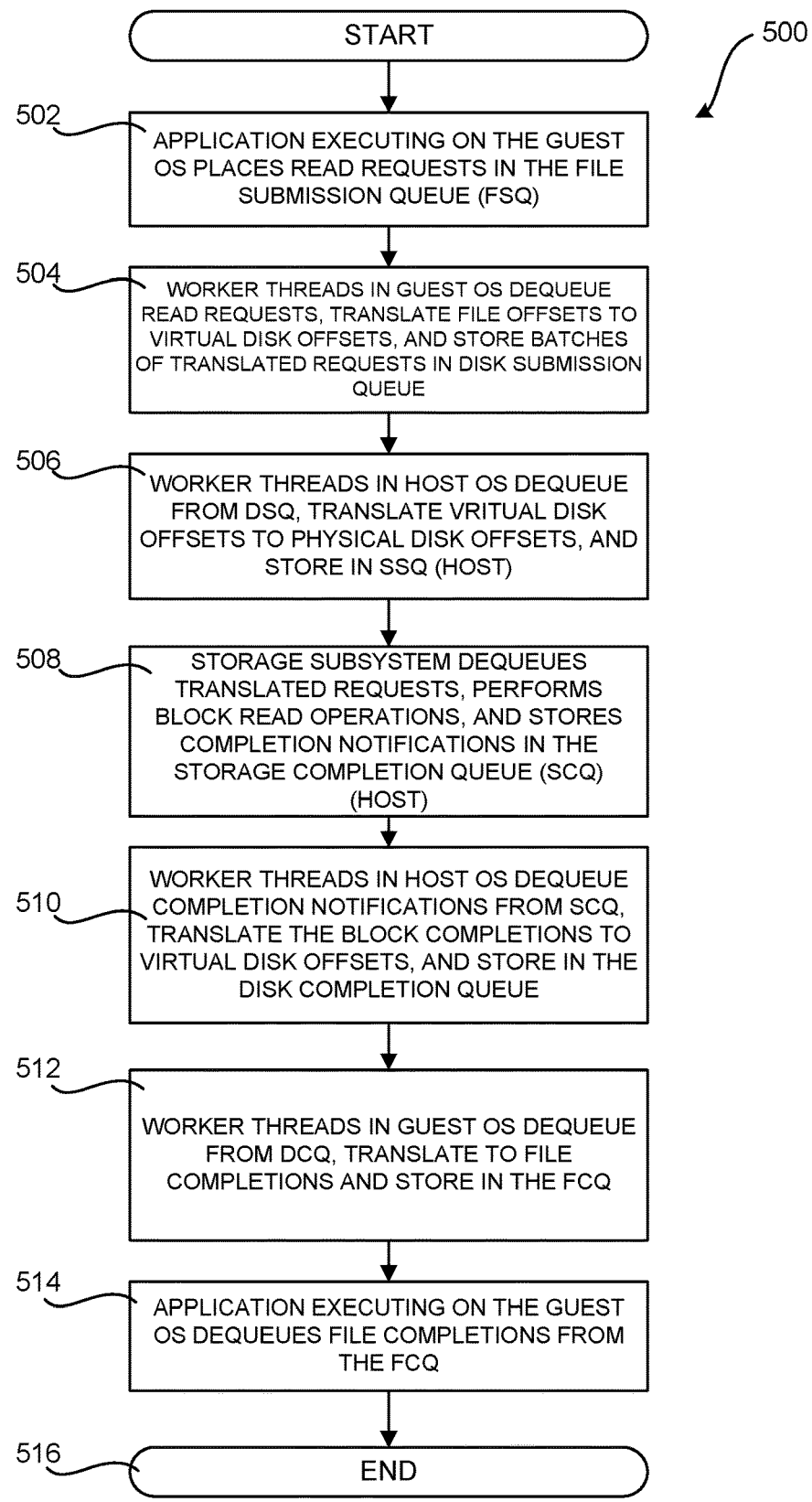
FIG. 5 is a flow diagram showing a routine that illustrates aspects of the operation of the storage stack shown in FIGS. 4A and 4B in a virtualized computing environment, according to one embodiment disclosed herein.

FIG. 5 is a flow diagram showing a routine 500 that illustrates aspects of the operation of the storage stack 102 in a virtualized computing environment such as that shown in FIGS. 4A and 4B and described above, according to one embodiment disclosed herein. The routine 500 begins at operation 502, where the user mode application 104 executing on the guest OS 400A enqueues read requests 106 on the FSQ 110. The routine 300 then proceeds from operation 502 to operation 504, where the worker threads 112C in the guest OS 400A dequeue batches of the read requests 106, translate file offsets in the read requests to virtual disk offsets, and store batches of the translated read requests 106C in the DSQ 402.

From operation 504, the routine 500 proceeds to operation 506, where the worker threads 112D executing in the host OS 400B dequeue the read requests 106C from the DSQ 402, translate the virtual disk offsets contained therein to physical disk offsets, and store batches of translated read requests 106D in the SSQ 114. The routine 500 then proceeds from operation 506 to operation 508, where the storage subsystem 116 dequeues batches of read requests 106D from the SSQ 114, performs the specified block read operations, and stores block completions 118 in the SCQ 122. The routine 500 then proceeds to operation 510.

At operation 510, worker threads 112E executing in the host OS 400B dequeue batches of block completions 118A from the SCQ 122, translate the batches of block completions 118A to completion notifications 118C with virtual disk offsets, and store the translated completions 118C in DCQ 404. The routine 500 then proceeds from operation 510 to operation 512, where worker threads 112F in the guest OS 400A translate the virtual disk offsets to file completions 118B and store the file completions 118B in the FCQ 124.

From operation 512, the routine 500 proceeds to operation 514, where the application 104 executing in the guest OS 400A dequeues the file completions 118B from the FCQ 124. The routine 500 then proceeds from operation 514 to operation 516, where it ends.

It is to be appreciated that while on a single set of queues has been illustrated and described above, multiple sets of queues might be utilized in other embodiments. For example, in one embodiment multiple instances of the queue configuration shown in FIG. 1 or FIGS. 4A and 4B are utilized. Each instance is utilized to process read requests 106 having a different priority. For example, one instance might be utilized for read requests 106 having a high priority, another instance might be utilized for read requests 106 having a medium priority, and another instance might be utilized for read requests 106 having a low priority. In this configuration, the storage subsystem 116 can be configured to process read requests 106 according to their priority. Other configurations will be apparent to those skilled in the art.

Figure 6:
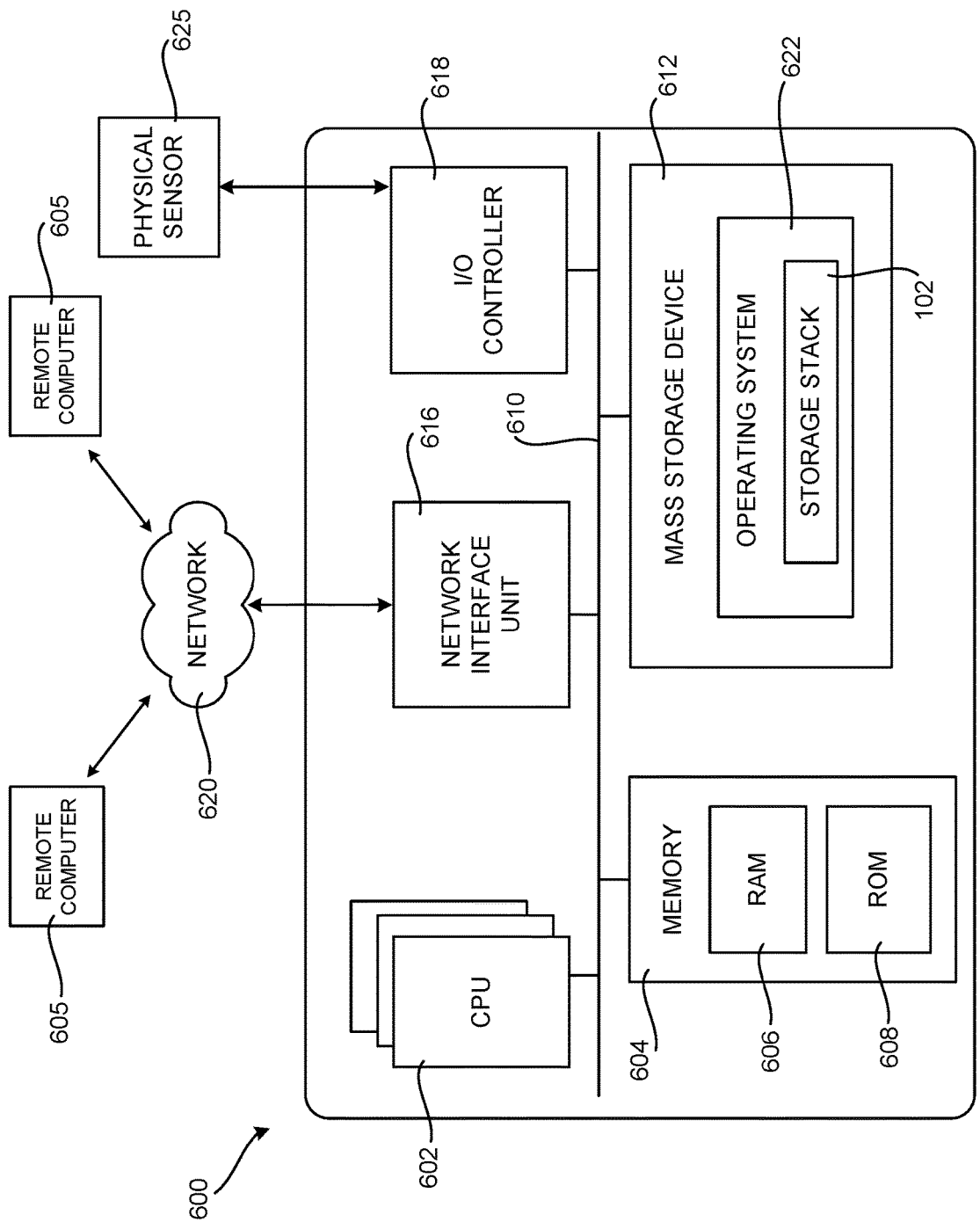
FIG. 6 is a computer architecture diagram showing an illustrative computer hardware and software architecture for a computing device that can implement aspects of the technologies presented herein.

FIG. 6 is a computer architecture diagram showing an illustrative computer hardware and software architecture for a computing device that can implement the various technologies presented herein. In particular, the architecture illustrated in FIG. 6 can be utilized to implement a game console, server computer, mobile phone, an e-reader, a smartphone, a desktop computer, an AR/VR device, a tablet computer, a laptop computer, or another type of computing device.

The computer 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system ("BIOS" or "firmware") containing the basic routines that help to transfer information between elements within the computer 600, such as during startup, can be stored in the ROM 608. The computer 600 further includes a mass storage device 612 for storing an operating system 622, components of the storage stack 102, application programs, and other types of programs. The mass storage device 612 can also be configured to store other types of programs and data.

The mass storage device 612 is connected to the CPU 602 through a mass storage controller (not shown) connected to the bus 610. The mass storage device 612 and its associated computer readable media provide non-volatile storage for the computer 600. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 600. For purposes of the claims, the phrase "computer storage medium," and variations thereof, does not include waves or signals per se or communication media.

According to various configurations, the computer 600 can operate in a networked environment using logical connections to remote computers through a network such as the network 620. The computer 600 can connect to the network 620 through a network interface unit 616 connected to the bus 610. It should be appreciated that the network interface unit 616 can also be utilized to connect to other types of networks and remote computer systems. The computer 600 can also include an input/output controller 618 for receiving and processing input from a number of other devices, including a keyboard, mouse, touch input, an electronic stylus (not shown in FIG. 6), or a physical sensor such as a video camera. Similarly, the input/output controller 618 can provide output to a display screen or other type of output device (also not shown in FIG. 6).

It should be appreciated that the software components described herein, when loaded into the CPU 602 and executed, can transform the CPU 602 and the overall computer 600 from a general-purpose computing device into a special-purpose computing device customized to facilitate the functionality presented herein. The CPU 602 can be constructed from any number of transistors or other discrete circuit elements, which can individually or collectively assume any number of states. More specifically, the CPU 602 can operate as a finite-state machine, in response to executable instructions contained within the software modules disclosed herein. These computer-executable instructions can transform the CPU 602 by specifying how the CPU 602 transitions between states, thereby transforming the transistors or other discrete hardware elements constituting the CPU 602.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 600 in order to store and execute the software components presented herein. It also should be appreciated that the architecture shown in FIG. 6 for the computer 600, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 600 might not include all of the components shown in FIG. 6, can include other components that are not explicitly shown in FIG. 6, or can utilize an architecture completely different than that shown in FIG. 6.

Figure 7:
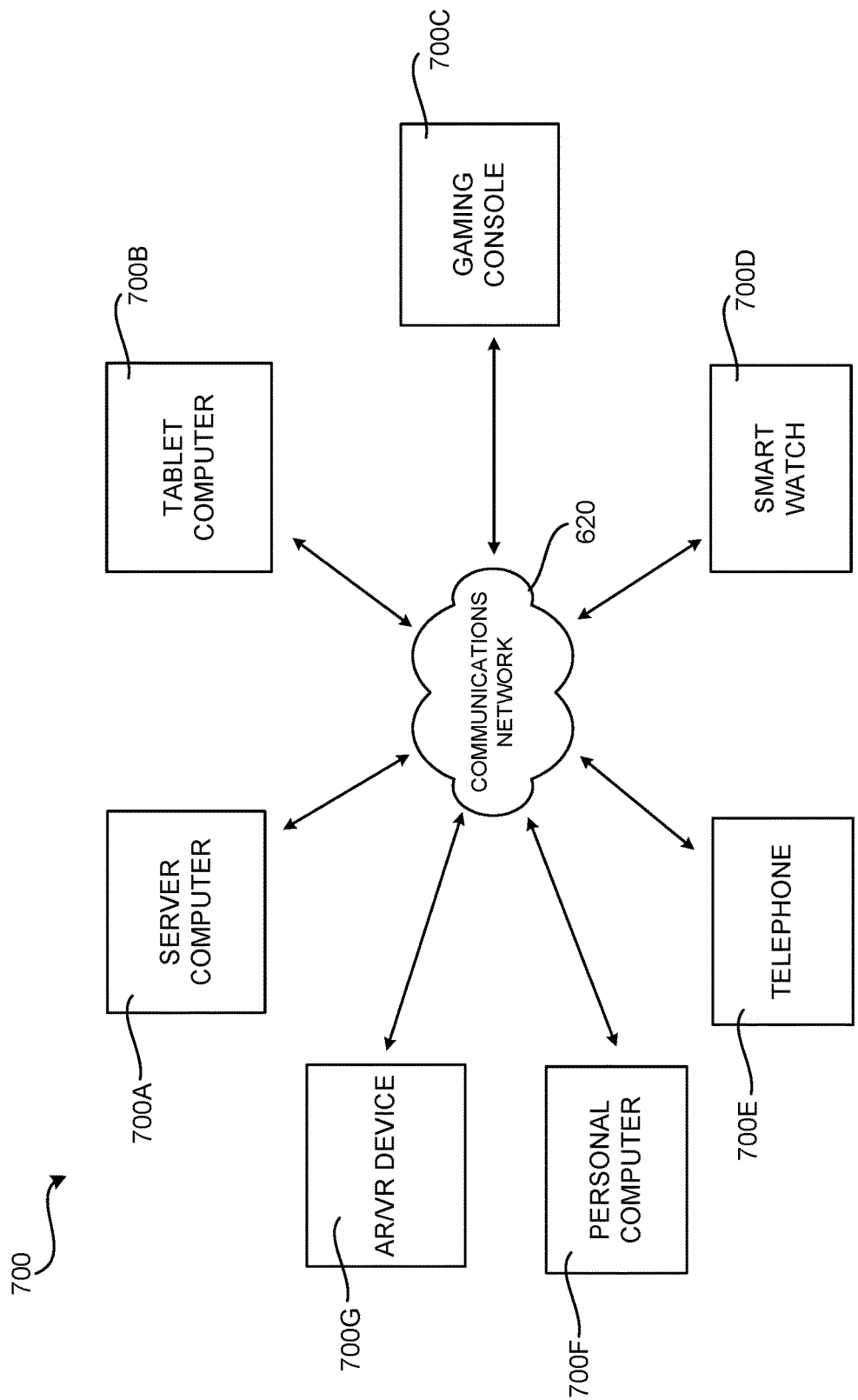
FIG. 7 is a network diagram illustrating a distributed computing environment in which aspects of the disclosed technologies can be implemented.

FIG. 7 is a network diagram illustrating a distributed network computing environment 700 in which aspects of the disclosed technologies can be implemented, according to various embodiments presented herein. As shown in FIG. 7, one or more server computers 700A can be interconnected via a communications network 620 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 700B, a gaming console 700C, a smart watch 700D, a telephone 700E, such as a smartphone, a personal computer 700F, and an AR/VR device 700G.

In a network environment in which the communications network 620 is the Internet, for example, the server computer 700A can be a dedicated server computer operable to process and communicate data to and from the client computing devices 700B-700G via any of a number of known protocols, such as, hypertext transfer protocol ("HTTP"), file transfer protocol ("FTP"), or simple object access protocol ("SOAP"). Additionally, the networked computing environment 700 can utilize various data security protocols such as secured socket layer ("SSL") or pretty good privacy ("PGP"). Each of the client computing devices 700B-700G can be equipped with an operating system operable to support one or more computing applications or terminal sessions such as a web browser (not shown in FIG. 7), or other graphical user interface (not shown in FIG. 7), or a mobile desktop environment (not shown in FIG. 7) to gain access to the server computer 700A.

The server computer 700A can be communicatively coupled to other computing environments (not shown in FIG. 7) and receive data regarding a participating user's interactions/resource network. In an illustrative operation, a user (not shown in FIG. 7) may interact with a computing application running on a client computing device 700B-700G to obtain desired data and/or perform other computing applications.

The data and/or computing applications may be stored on the server 700A, or servers 700A, and communicated to cooperating users through the client computing devices 700B-700G over an exemplary communications network 620. A participating user (not shown in FIG. 7) may request access to specific data and applications housed in whole or in part on the server computer 6800A. These data may be communicated between the client computing devices 700B-700G and the server computer 700A for processing and storage.

The server computer 700A can host computing applications, processes and applets for the generation, authentication, encryption, and communication of data and applications, and may cooperate with other server computing environments (not shown in FIG. 7), third party service providers (not shown in FIG. 7), network attached storage ("NAS") and storage area networks ("SAN") to realize application/data transactions.

It should be appreciated that the computing architecture shown in FIG. 6 and the distributed network computing environment shown in FIG. 7 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method, comprising: storing batches of requests to read a file received from an application in a first queue, the requests comprising file offsets for the file; translating the batches of file offsets for the file to disk offsets; and storing translated batches of the requests comprising the disk offsets in a second queue, wherein the second queue is accessible to a storage subsystem configured to retrieve the translated batches of the requests from the second queue and perform read operations on the file using the disk offsets.

Clause 2. The computer-implemented method of clause 1, wherein the storage subsystem is further configured to store completion notifications for the read operations in a third queue, and wherein the method further comprises: translating batches of the completion notifications in the third queue to file completions; and storing the file completions in a fourth queue accessible to the application.

Clause 3. The computer-implemented method of any of clauses 1-2, wherein the translating of the file offsets for the file to disk offsets is performed responsive to satisfaction of a condition specified by the application, and wherein the condition comprises expiration of a timer.

Clause 4. The computer-implemented method of any of clauses 1-3, wherein the translating of the file offsets for the file to disk offsets is performed responsive to satisfaction of a condition specified by the application, and wherein the condition comprises the first queue containing a pre-defined number of the requests.

Clause 5. The computer-implemented method of any of clauses 1-4, wherein the translating of the file offsets for the file to disk offsets is performed responsive to satisfaction of a condition specified by the application, and wherein the condition comprises the first queue containing requests for a pre-defined amount of data.

Clause 6. The computer-implemented method of any of clauses 1-5, wherein the translating of the file offsets for the file to disk offsets is performed responsive to receiving a request from the application.

Clause 7. The computer-implemented method of any of clauses 1-6, wherein the translating of the batches of the completion notifications in the third queue to file completions is performed responsive to the expiration of a timer.

Clause 8. A computer-implemented method, comprising: storing batches of requests to read a file in a first queue, the requests comprising file offsets for the file and being received from an application executing in a guest operating system (OS); translating the file offsets for the file to virtual disk offsets and storing translated batches of the requests comprising the virtual disk offsets in a second queue accessible to a host OS; and translating the virtual disk offsets for the file to physical disk offsets, and storing translated batches of the requests comprising the physical disk offsets in a third queue, wherein the third queue is accessible to a storage subsystem configured to retrieve the translated batches of the requests comprising the physical disk offsets from the third queue and perform read operations on the file using the physical disk offsets.

Clause 9. The computer-implemented method of clause 8, wherein the storage subsystem is further configured to store completion notifications for the read operations in a fourth queue, and wherein the method further comprises: translating the completion notifications in the fourth queue to completion notifications comprising virtual disk offsets, and storing the completion notifications comprising the virtual disk offsets in a fifth queue accessible to the guest OS; and translating batches of the completion notification in the fifth queue to file completions and storing the file completions in a sixth queue accessible to the application executing in the guest OS.

Clause 10. The computer-implemented method of any of clauses 8-9, wherein the translating of the file offsets for the file to disk offsets is performed responsive to satisfaction of a condition specified by the application, and wherein the condition comprises expiration of a timer.

Clause 11. The computer-implemented method of any of clauses 8-10, wherein the translating of the file offsets for the file to disk offsets is performed responsive to satisfaction of a condition specified by the application, and wherein the condition comprises the first queue containing a pre-defined number of the requests.

Clause 12. The computer-implemented method of any of clauses 8-11, wherein the translating of the file offsets for the file to disk offsets is performed responsive to satisfaction of a condition specified by the application, and wherein the condition comprises the first queue containing requests for a pre-defined amount of data.

Clause 13. The computer-implemented method of any of clauses 8-12, wherein the translating of the file offsets for the file to disk offsets is performed responsive to receiving a request from the application.

Clause 14. The computer-implemented method of any of clauses 8-13, wherein the translating of the batches of the completion notifications in the fourth queue to completion notifications comprising virtual disk offsets is performed responsive to the expiration of a timer.

Clause 15. A computer-implemented method, comprising: exposing an application programming interface (API) to an application, the API comprising a first function; receiving a call to the first function from the application, the call comprising a plurality of requests to read a file, the requests comprising file offsets for the file; responsive to receiving the call to the first function of the API, storing the plurality of requests in a first queue, translating the file offsets for the file to disk offsets, and storing translated batches of the requests comprising the disk offsets in a second queue, wherein the second queue is accessible to a storage subsystem configured to retrieve the translated batches of the requests from the second queue and perform read operations on the file using the disk offsets.

Clause 16. The computer-implemented method of clause 15, wherein the API comprises a second function, and wherein the method further comprises creating the first queue responsive to receiving a call from the application to the second function.

Clause 17. The computer-implemented method of any of clauses 15-16, wherein the API comprises a third function, and wherein the method further comprises closing the first queue responsive to receiving a call from the application to the third function.

Clause 18. The computer-implemented method of any of clauses 15-17, wherein the API comprises a fourth function, and wherein the method further comprises opening the file responsive to receiving a call from the application to the fourth function.

Clause 19. The computer-implemented method of any of clauses 15-18, wherein the API comprises a fifth function, wherein the completion notifications for the read operations are stored in a third queue, and wherein the method further comprises providing the completion notifications to the application responsive to a call from the application to the fifth function.

Clause 20. The computer-implemented method of any of clauses 15-19, wherein the API comprises a sixth function, and wherein the translating of the file offsets for the file to disk offsets and the storing of the translated batches of the requests in the second queue are performed responsive to receiving a call from the application to the sixth function.

Based on the foregoing, it should be appreciated that technologies for reducing per-I/O CPU overhead by queuing and batching read requests and read completion notifications have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example embodiments and applications illustrated and described, and without departing from the scope of the present disclosure, which is set forth in the following claims.

What is claimed is:

1. A computer-implemented method, comprising:
    storing batches of requests to read a file received from an application in a first queue, the requests comprising file offsets for the file;
    translating the batches of requests comprising the file offsets for the file to batches of requests comprising disk offsets, wherein the translating is performed responsive to at least one of:
        satisfaction of a first condition specified by the application, the first condition comprising expiration of a timer;
        satisfaction of a second condition specified by the application, the second condition comprising the first queue containing a pre-defined number of the requests; or
        satisfaction of a third condition specified by the application, the third condition comprising the first queue containing requests for a pre-defined amount of data; and
    storing the batches of requests comprising the disk offsets in a second queue, wherein the second queue is accessible to a storage subsystem configured to retrieve the the batches of requests comprising the disk offsets from the second queue and perform read operations on the file using the disk offsets.

2. The computer-implemented method of claim 1, wherein the storage subsystem is further configured to store completion notifications for the read operations in a third queue, and wherein the method further comprises:
    translating batches of the completion notifications in the third queue to file completions; and
    storing the file completions in a fourth queue accessible to the application.

3. The computer-implemented method of claim 1, wherein the translating of the file offsets for the file to disk offsets is performed responsive to receiving a request from the application.

4. The computer-implemented method of claim 2, wherein the translating of the batches of the completion notifications in the third queue to file completions is performed responsive to the expiration of a timer.

5. A computer-implemented method, comprising:
    storing batches of requests to read a file in a first queue, the requests comprising file offsets for the file and being received from an application executing in a guest operating system (OS);
    translating the file offsets for the file to virtual disk offsets and storing translated batches of requests comprising the virtual disk offsets in a second queue accessible to a host OS, wherein the translating is performed responsive to at least one of:
        satisfaction of a first condition specified by the application, and wherein the first condition comprises expiration of a timer,
        satisfaction of a second condition specified by the application, and wherein the second condition comprises the first queue containing a pre-defined number of the requests, or
        satisfaction of a third condition specified by the application, and wherein the third condition comprises the first queue containing requests for a pre-defined amount of data; and
    translating the virtual disk offsets for the file to physical disk offsets, and storing translated batches of requests comprising the physical disk offsets in a third queue, wherein the third queue is accessible to a storage subsystem configured to retrieve the translated batches of requests comprising the physical disk offsets from the third queue and perform read operations on the file using the physical disk offsets.

6. The computer-implemented method of claim 5, wherein the storage subsystem is further configured to store completion notifications for the read operations in a fourth queue, and wherein the method further comprises:
    translating the completion notifications in the fourth queue to completion notifications comprising virtual disk offsets, and storing the completion notifications comprising the virtual disk offsets in a fifth queue accessible to the guest OS; and
    translating batches of the completion notification in the fifth queue to file completions and storing the file completions in a sixth queue accessible to the application executing in the guest OS.

7. The computer-implemented method of claim 5, wherein the translating of the file offsets for the file to disk offsets is performed responsive to receiving a request from the application.

8. The computer-implemented method of claim 6, wherein the translating of the batches of the completion notifications in the fourth queue to completion notifications comprising virtual disk offsets is performed responsive to the expiration of a timer.

9. A computer-implemented method, comprising:
    exposing an application programming interface (API) to an application, the API comprising a first function and a second function;
    creating a first queue responsive to receiving a call from the application to the second function;
    receiving a call to the first function from the application, the call comprising a plurality of requests to read a file, the plurality of requests comprising file offsets for the file;
    responsive to receiving the call to the first function of the API,
        storing the plurality of requests in the first queue,
        translating the file offsets for the file to disk offsets, and storing translated batches of requests comprising the disk offsets in a second queue, wherein the second queue is accessible to a storage subsystem configured to retrieve the translated batches of requests from the second queue and perform read operations on the file using the disk offsets.

10. The computer-implemented method of claim 9, wherein the API comprises a third function, and wherein the method further comprises closing the first queue responsive to receiving a call from the application to the third function.

11. The computer-implemented method of claim 9, wherein the API comprises a fourth function, and wherein the method further comprises opening the file responsive to receiving a call from the application to the fourth function.

12. The computer-implemented method of claim 9, wherein the API comprises a fifth function, wherein the completion notifications for the read operations are stored in a third queue, and wherein the method further comprises providing the completion notifications to the application responsive to a call from the application to the fifth function.

13. The computer-implemented method of claim 9, wherein the API comprises a sixth function, and wherein the translating of the file offsets for the file to disk offsets and the storing of the translated batches of the requests in the second queue are performed responsive to receiving a call from the application to the sixth function.

* * * * *